United States Patent [19]

Imai et al.

[11] Patent Number: 5,719,741
[45] Date of Patent: Feb. 17, 1998

[54] ZINC-DEPOSITED BASE MATERIAL FOR METALLIZED CAPACITORS AND METHOD OF MANUFACTURE THEREOF

[75] Inventors: Makoto Imai; Toshiyuki Takagi, both of Nakatsugawa; Hideki Ikeda, Tokyo; Yasuo Takahashi; Mamoru Murata, both of Nakatsugawa, all of Japan

[73] Assignee: Oji Paper Co., Ltd., Tokyo, Japan

[21] Appl. No.: 656,192

[22] PCT Filed: Oct. 6, 1995

[86] PCT No.: PCT/JP95/02049

§ 371 Date: May 24, 1996

§ 102(e) Date: May 24, 1996

[87] PCT Pub. No.: WO96/11485

PCT Pub. Date: Apr. 18, 1996

[30] Foreign Application Priority Data

Oct. 7, 1994 [JP] Japan ................... 6/244131

[51] Int. Cl.[6] ........................................ H01G 4/06
[52] U.S. Cl. .................. 361/321.4; 361/313; 361/321.1; 361/322; 361/324; 428/213; 428/215; 428/216; 428/336; 428/448; 428/450; 428/451; 428/452; 428/469; 428/472; 427/79; 427/81
[58] Field of Search ........................ 361/303, 305, 361/311, 312, 313, 320, 321.1, 321.2, 321.3, 321.4, 321.5, 322, 324; 428/213, 215, 216, 336, 432, 433, 446, 448, 450, 451, 452, 469, 472; 427/79, 81

[56] References Cited

U.S. PATENT DOCUMENTS 4,785,374  11/1988  Nagai et al. ................ 361/305
5,061,568  10/1991  Kessel et al. ............... 428/437

FOREIGN PATENT DOCUMENTS 52-31369  3/1977  Japan.
6-244054  9/1994  Japan.

*Primary Examiner*—D. S. Nakarani
*Attorney, Agent, or Firm*—Flynn, Thiel, Boutell & Tanis, P.C.

[57] ABSTRACT

When forming a zinc-deposited base material for metallized capacitors, a primer layer for zinc-deposition made from at least one compound selected from the group comprised of an oxide of silicon, titanium and zirconium is formed on at least one side surface of a base body comprised of a film or a thin condenser paper. Next, a zinc-deposited layer is formed on top of the primer layer. Then, a protective layer made from at least one compound selected from the group comprised of silicon-based oil, fluoro-based oil, alkylnaphthalene, polydiphenylether, fatty acids, fatty acid salts and paraffin wax is formed on top of the zinc-deposited layer. In this way, it becomes possible to form a zinc-deposited base material having excellent moisture resistance when used for metallized capacitors.

8 Claims, No Drawings

ZINC-DEPOSITED BASE MATERIAL FOR METALLIZED CAPACITORS AND METHOD OF MANUFACTURE THEREOF

BACKGROUND OF THE INVENTION

1. Field of the Invention

The present invention relates to a zinc-deposited base material for metallized capacitors, such as those used in power capacitors and the like, and a method of manufacture thereof, and in particular relates to technology for improving moisture resistance.

2. Description of the Prior Art

Power capacitors have been used, for example, in power plants and substations for power factor improvement, voltage regulation and power flow adjustment and the like. In recent years, as such power capacitors, metallized capacitors are practically employed. The metallized capacitor includes electrodes which are formed by depositing a metal such as zinc or aluminum onto a film, such as polypropylene film, polyester film or the like, or a thin condenser paper (condenser tissue).

One type of such metallized capacitors found in the prior art is disclosed in Japanese Patent Publication Number SHO-57-51251 (hereinafter, referred to as "Prior Art Reference 1") filed by the applicant of this application. As described in Prior Art Reference 1, a metal and metalloid or nitride is deposited onto a dielectric surface in accordance with the degree of roughness of such surface, and then a metallic electrode layer is formed thereon by vapor deposition.

For example, after depositing silicon monoxide on one side surface of an insulating paper to form a layer having a thickness of approximately 0.5 mm, zinc is deposited over such layer, excepting a non-deposited portion which is left as it is to form an insulating portion on the layer, thereby forming a metallized paper. Then, two of these metallized papers are stacked together and rolled up to form capacitor elements. In this way, the dielectric dissipation factor can be made small, thus making it possible to obtain high dielectric characteristics.

Unfortunately, however, in the metallized capacitor disclosed in Prior Art Reference 1, no consideration is taken to its moisture resistance. Namely, because the layer of zinc which is deposited is extremely thin at a thickness of 5–60 nm, exposure at all times to oxygen and moisture in the surrounding air is likely to cause such layer to transform into oxides and hydroxides, which results in lowering the conductivity of such layer. As a result, the metal-deposited layer of which conductivity has been lowered can not be used as an electrode.

In this connection, in order to improve moisture resistance of the zinc-deposited capacitors, the applicant of this application proposed another type of a zinc-deposited capacitor which is disclosed in Japanese Laid-Open Patent Application Number SHO-62-130503 (hereinafter, referred to as "Prior Art Reference 2"). As described in Prior Art Reference 2, in the zinc-deposited capacitor, a layer having a 0.7–50 nm thickness which is formed of silicon oil, fatty acid or paraffin wax or the like is applied on a zinc-deposited layer under constant vapor pressure.

Further, Japanese Laid-Open Patent Application Number HEI-1-158714 (hereinafter, referred to as "Prior Art Reference 3") discloses a capacitor having a zinc-deposited layer which is covered by a 0.3–20 mg/m² protective coating made from silicon and silicon oxide. Furthermore, in Japanese Laid-Open Patent Application Number SHO-62-279819 (hereinafter, referred to as "Prior Art Reference 4"), there is disclosed another capacitor with an improved self-protective function which is achieved by preventing the electrode from oxidizing by blocking off oxygen. For this purpose, the capacitor includes a metallized plastic having a metallized surface which is covered with an insulating oxide layer having 5–100nm thickness and made from silicon oxide, aluminum oxide or the like.

However, the method disclosed in Prior Art Reference 2 which uses the protective layer having a 0.7–50 nm thickness and made from silicon oil, fatty acid or paraffin wax or the like and the method disclosed in Prior Art Reference 3 which uses the protective layer having a 0.3–20mg/m² thickness of silicon and silicon oxide are insufficient for adequately blocking off oxygen and moisture. Therefore, zinc-deposited capacitors having a practically satisfactory moisture resistance have not yet been available.

Now, in accordance with research conducted by the present inventors and others, it has been found that in order to completely block off all oxygen and moisture to obtain a zinc-deposited capacitor having a practically satisfactory moisture resistance, it is necessary to have a deposition layer having a 70–100 nm thickness in the case where oxides such as for example silicon oxide, aluminum oxide or the like are used. In this case, it is possible to obtain sufficient moisture resistance with a protective layer of the oxide material having a thickness more than 70 nm deposited on the zinc layer. However, such construction is not practical because it results in extremely high production costs for such capacitors. Moreover, a protective layer having such a thickness will easily crack, and this requires the additional provision of a means for preventing cracks. For these reasons, the capacitor disclosed in Prior Art Reference 4 is not practical.

In view of the above, it is an object of the present invention to provide a zinc-deposited base material for metallized capacitors and a method of manufacture thereof, in which such zinc-deposited base material has improved characteristics as a capacitor with a low dielectric dissipation factor, and in which electrodes thereof do not suffer a loss of conductivity even when exposed to air or moisture.

SUMMARY OF THE INVENTION

The zinc-deposited base material for metallized capacitors according to the present invention uses a film or a thin condenser paper as its base body. A base body used in the zinc-deposited base materials of the prior art can be used as it is. When using a film for the base body, it is possible to utilize a film made of resin. Examples of such a resin include polyester film, polypropylene film, polycarbonate film or the like. Further, when using a thin condenser paper, it is possible to utilize a thin paper used as a dielectric body of a capacitor. Such a thin paper can be made by finely pulverizing a base material of high quality vegetable fiber and then spreading such pulverized material out for drying to form a sheet (such a thin paper is determined by Japanese Industrial Standard as JIS C-2302).

In any case, even though there is no limitation as to the thickness of the film and thin condenser paper, it is determined by taking the working voltage, the type of capacitor and other such factors into consideration. Usually, it is preferred that the thickness of the film or thin condenser paper lies within the range of about 3–30 μm. Furthermore, a corona discharge process may be carried out on the surface of the film described above in order to achieve an improvement in the deposition strength of the vapor-deposited zinc and other materials used for a primer layer.

In this connection, onto the base body, there is formed a primer layer for zinc-deposition which is formed of at least one oxide selected from silicon, titanium and zirconium. In this regard, each oxide of silicon, titanium and zirconium is not limited to compound in which each element and oxygen exist under stoichiometric ratios; instead it is also possible to utilize compounds in which each of the elements exists in arbitrary mixture ratio. For example, when using oxides of silicon, it is possible to use not only $SiO_2$ but also a mixture of silicon oxides having an average formula of $SiO_x$ ($0<33$ 21 2). Further, in the same manner, when using oxides of titanium or zirconium, it is possible to use not only $TiO_2$ or $ZrO_2$ but also a mixture of titanium oxides or zirconium oxides having an average formula of $TiO_x$ ($0<x<2$) or $ZrO_x$ ($0<x<2$), respectively.

Preferably, an appropriate average thickness of such a primer layer for zinc-deposition comprised of above oxides lies within the range of 0.01–10 nm, and more preferably such thickness lies within the range of 0.1–2 nm. In this regard, if the thickness of such layer is smaller than 0.01 nm, it is not possible to create a stable layer of zinc deposited thereon, and if the thickness of such layer is greater than 10 nm, there will be an excess amount of such oxide material and this leads to high costs. Further, it should be noted that the primer layer does not usually have a uniform thickness, but is instead generally spread above the base material with small lumps of oxide material.

Further, a zinc-deposited layer having a thickness of 5–60 nm, for example, is formed on the primer layer described above. In this regard, the thickness of such zinc-deposited layer is preferably within the range of 15–50 nm.

Furthermore, the zinc-deposited base material according to the present invention includes a protective layer provided on top of the zinc-deposited layer. As for the protective layer, it is formed from a material which exhibits a vapor pressure of 0.1 mmHg at a temperature of 150°–290° C. and it is formed into a layer having a thickness of 0.7–50 nm. By providing such a protective layer, the moisture resistance of the zinc-deposited base material is improved, and there is no need to carry out a separate moisture resistance treatment or the like when the zinc-deposited base material is left in a rolled up state or in a product state for an extended period of time.

Moreover, in the case where a material of which temperature can not reach 150° C. at a vapor pressure of 0.1 mmHg is used when forming the protective layer, a great deal of vaporization will take place during the heat pressing process at the time the capacitors are being manufactured, and this causes voids to form in the protective layer material as a result of expansion thereof, which in turn makes it easy for internal discharges to occur, whereby the dielectric dissipation factor becomes large. As a result, there is a tendency for the performance of the capacitor to go down. On the other hand, if the temperature exceeds 290° C. at the time when the protective layer material is being vaporized by a vacuum evaporator, the apparatus must be designed so as to be able to withstand such high temperature. However, since thus designed apparatus tends to become a large size, it is not practical. Furthermore, when such high temperatures are employed, other problems arise as to the heat resistance for the base body such as the film and the thin condenser paper.

As for a material which can be used for forming the protective layer under the preferred vapor pressure conditions described above, any one of the following example materials can be selected: silicon-based oils, fluoro-based oils, alkylnaphthalene, polydiphenylether, fatty acids, fatty acid salts, paraffin wax and the like. As for the silicon-based oils, it is preferable to use one which exhibits a stable state at high temperatures or in a vacuum. Examples of such a material include dimethylpolysiloxane, methylphenylpolysiloxane and the like, which can generally be used as a silicon oil for use in a vacuum pump. Further, as for an example of fluoro-based oils, it is possible to use perfluoropolyether. Furthermore, as for examples of fatty acids, it is possible to use stearic acid, palmitic acid, oleic acid and the like.

Fatty acid salts means salts of the fatty acids mentioned above. Examples of such fatty acid salts include zinc, calcium, copper, lithium and the like. Further, examples of paraffin wax include $C_{30}H_{62}$ (triacontane), $C_{34}H_{70}$ (tetratriacontane), $C_{36}H_{74}$ (hexatriacontane) and the like. In this connection, the properties of these materials are shown in Table 1.

With regard to the thickness of the protective layer, it is preferred that the thickness lies within the range of 0.7–50 nm. If such thickness is below 0.7 nm, such a protective does not exhibit proper protective effect. On the other hand, if the thickness of the protective layer exceeds 50 nm, the capacitor will have improved moisture resistance but the dielectric dissipation factor $tan\delta$ characteristics will tend to go down. Namely, if the protective layer is too thick, revaporization of oil applied to the capacitor element will occur due to the heating in the heat pressing process machine when a capacitor is being manufactured. For this reason, it is not possible to carry out a uniform heat setting, and this causes a large number of voids to remain inside the protective layer material. As a result, the dielectric dissipation factor becomes extremely high in the region where a corona discharge of 300V or higher is generated, and this may make it impossible for the capacitor to withstand working conditions. Further, in order to give sufficient electrical and moisture-resistant characteristics to the protective layer, it is important that the protective layer is formed as thin as possible and that it applied uniformly. In this connection, it is preferred that the protective layer is formed by a vacuum deposition method like that described hereinbelow.

In addition to the types of the protective layers described above, it is possible to use another protective layer having a thickness of 1–30 nm made from at least one oxide of silicon, titanium and zirconium. In this case, it is possible to use the same oxides of silicon, titanium and zirconium that are used to form the primer layer described above. Further, in the case where the thickness of the protective layer is below 1 nm, the protective layer will be too thin to be effective. On the other hand, in the case where the thickness of the protective layer exceeds 30 nm, there is little increase in the effect of the protective layer, but in turn it increases costs greatly. Further, there is also the possibility that cracks will be formed in the protective layer. Therefore, the preferred thickness of the protective layer is in the range of 1.5–10 nm.

Hereinbelow, a description is made with regard to the steps of forming a zinc-deposited base material for metallized capacitors according to the present invention.

In the zinc-deposited base material of the present invention, at least one compound selected from the group comprising silicon, titanium, zirconium and the various oxides thereof is used as a depositing material. The zinc-deposited base material according to the present invention is made by forming a primer layer for zinc-deposition made from at least one oxide of silicon, titanium and zirconium on at least one side surface of a base body such as a film, a thin condenser paper or the like, forming a zinc-deposited layer on top of the primer layer, and then forming a protective layer on top of the zinc-deposited layer. In particular, it is preferred that the formation of the primer layer, zinc-deposited layer and protective layer be carried out in the same vacuum deposition apparatus.

The primer layer is formed by placing a base body comprised of a film or a thin condenser paper inside a vacuum deposition apparatus, operating the apparatus to cause the internal pressure thereof to lie within the range of $10^{-2}$–$10^{-6}$ mmHg, and then carrying out deposition onto the base body using at least one compound selected from the group comprising silicon, titanium, zirconium and the various oxides thereof as a depositing material according to vacuum deposition, sputtering or ion plating method. In this connection, it is also possible to obtain stable oxides by carrying out the above-described vacuum deposition while introducing oxygen gas into the inside of the vacuum deposition apparatus.

After the formation of the deposition of the primer layer, a zinc-deposition is carried out within the vacuum atmosphere in the range of $10^{-2}$–$10^{-6}$ mmHg to form the zinc-deposited layer using the same method as was used to form the primer layer. As was described above, the zinc is deposited so as to form a zinc-deposited layer having a thickness in the range of 5–60 nm.

After the formation of the zinc-deposited layer, the protective layer is formed.

In the case where the protective layer is formed from a material which exhibits a vapor pressure of 0.1 mmHg at a temperature lying within the range of 150°–290° C., the material which is used to form the protective layer is placed inside the vacuum deposition apparatus and heated to deposit such material onto the zinc-deposited layer. In this case, the thickness of the protective layer is determined by the amount of vapor generated from the oil or the like which is used as the material for the protective layer. The amount of vapor generated can be controlled easily by controlling the heating temperature inside the vacuum deposition apparatus. With this method, it becomes easy to form the protective layer which is extremely thin and uniform.

Further, in the case where the protective layer is made from an oxide of silicon, titanium or zirconium, it is possible to form the protective layer using the same deposition method as was used to form the primer layer.

Further, in accordance with the present invention, it is possible to obtain a zinc-deposited base material having a zinc-deposited layer and a protective layer on both sides thereof by forming the above-described primer layer, zinc-deposited layer and protective layer in that order on both sides of the base body.

Thus, in accordance with the present invention, it becomes possible to provide a novel zinc-deposited base material for metallized capacitors and a method of manufacture thereof in order to provide a zinc-deposited capacitor having practically sufficient moisture resistance.

DETAILED DESCRIPTION OF THE PREFERRED EMBODIMENTS

Now, in order to demonstrate the advantages of the present invention, the present inventor made several specific embodiments of a zinc-deposited base material for metallized capacitors according to the present invention and then compared such base materials with other base materials that were not made in accordance with the present invention. The specific embodiments and the results of such comparison will be described below.

Testing Method of Evaluation

Measurement of tanδ

The base materials obtained in each of the embodiments and comparative examples were rolled up using an ordinary method, and then they were heat pressed at a pressure of 40 kg/cm² and at a temperature of 100° C. for 20 minutes. Next, after the end faces of the rolled-up capacitor elements were sprayed with zinc particles using a zinc arc-type metallicon apparatus, the capacitor elements were connected to lead wires to form a 2.5 µF capacitor for test purposes. Then, the tanδ of the capacitors were measured at atmospheric pressure of 23° C. using an automatic precision sharing bridge (made by Soken Electric Co., Ltd.).

Evaluation of Moisture Resistance

(1) Changes of External Appearance

Each of the capacitor elements was subjected to atmospheric conditions of 40° C. at 90% humidity and 70° C. at 65% humidity, respectively, for 48 hours, and then the exterior of the zinc-deposited layer of each element was observed visually for changes thereof (Table 2).

(2) ΔMR/MRO (%)

The ratio between the initial resistance value MRO of the zinc-deposited layer and the changed resistance value ΔMR of the zinc-deposited layer 72 hours later was measured using a Loroste AP (Product name) resistance meter made by Mitsubishi Oil Co., Ltd. (Table 1).

Embodiment 1

After a primer layer for zinc-deposition made of SiO for zinc-deposition and having an average thickness of 0.3 nm was formed by a vacuum deposition at a pressure of $1\times10^{-3}$ mmHg onto one side surface of a polypropylene film having a thickness of 5 µm, a zinc layer having a thickness of 40 µm was deposited onto the primer layer. Then, in the same vacuum deposition apparatus that was used to form the zinc-deposited layer, a protective layer having an average thickness of 2 nm was formed on top of the zinc-deposited layer using methylphenylpolysiloxane (silicon oil) as indicated by the symbol F in Table 1 to form a zinc-deposited base material for metallized capacitors. The moisture resistance and dielectric dissipation factor tanδ values were measured, and the results thereof are shown in Table 2.

Embodiment 2

After a primer layer for zinc-deposition made of SiO₂ and having an average thickness of 0.3 nm was formed by vacuum deposition at a pressure of $1\times10^{-3}$ mmHg onto one side surface of a polypropylene film having a thickness of 5 µm, a zinc layer having a thickness of 40 µm was deposited onto the primer layer. After these steps were completed, the same steps as were carried out after the formation of the zinc-deposited layer in Embodiment 1 were then carried out in this embodiment to form a zinc-deposited base material for metallized capacitors. The results of measurements are shown in Table 2.

Embodiment 3

After a primer layer for zinc-deposition made of a mixture of Si and SiO₂ at a weight ratio of 1:3 (average composition $SiO_{1.5}$) and having an average thickness of 0.3 nm was formed by vacuum deposition at a pressure of $1\times10^{-3}$ mmHg onto one side surface of a polypropylene film having a thickness of 5 μm, a zinc layer was deposited onto the primer layer so as to have a thickness of 40 μm. After these steps were completed, the same steps as were carried out after the formation of the zinc-deposited layer in Embodiment 1 were then carried out in this embodiment to form a zinc-deposited base material for metallized capacitors. The results of measurements are shown in Table 2.

Embodiment 4

After a primer layer for zinc-deposition made of $TiO_2$ and having an average thickness of 0.3 nm was formed by vacuum deposition at a pressure of $1\times10^{-3}$ mmHg onto one side surface of a polypropylene film having a thickness of 5 μm, a zinc layer having a thickness of 40 μm was deposited onto the primer layer. After this was completed, the same steps as were carried out after the formation of the zinc-deposited layer in Embodiment 1 were then carried out in this embodiment to form a zinc-deposited base material for metallized capacitors according to the present invention. The results of measurements are shown in Table 2.

Embodiment 5

After a primer layer for zinc-deposition made of $ZrO_2$ and having an average thickness of 0.3 nm was formed by vacuum deposition at a pressure of $1\times10^{-3}$ mmHg onto one side surface of a polypropylene film having a thickness of 5 μm, a zinc layer having a thickness of 40 μm was deposited onto the primer layer. After this was completed, the same steps as were carried out after the formation of the zinc-deposited layer in Embodiment 1 were then carried out in this embodiment to form a zinc-deposited base material for metallized capacitors according to the present invention. The results of measurements are shown in Table 2.

Embodiment 6

Except for using dimethylpolysiloxane having an average thickness of 2 nm, as indicated by the symbol B in Table 1, instead of methylphenylpolysiloxane which was used to form the protective layer in Embodiment 1, the same steps as were carried out in Embodiment 1 were carried out in this embodiment to form a zinc-deposited base material for metallized capacitors. The results of measurements are shown in Table 2.

Embodiment 7

Except for using perfluoropolyether (fluoro-based oil) having an average thickness of 2 nm, as indicated by the symbol H in Table 1, instead of methylphenylpolysiloxane which was used to form the protective layer in Embodiment 1, the same steps as were carried out in Embodiment 1 were carried out in this embodiment to form a zinc-deposited base material for metallized capacitors. The results of measurements are shown in Table 2.

Embodiment 8

Except for using alkylnaphthalene having an average thickness of 2 nm, as indicated by the symbol J in Table 1, instead of methylphenylpolysiloxane which was used to form the protective layer in Embodiment 1, the same steps as were carried out in Embodiment 1 were carried out in this embodiment to form a zinc-deposited base material for metallized capacitors. The results of measurements are shown in Table 2.

Embodiment 9

Except for using stearic acid having an average thickness of 2 nm, as indicated by the symbol L in Table 1, instead of methylphenylpolysiloxane which was used to form the protective layer in Embodiment 1, the same steps as were carried out in Embodiment 1 were carried out in this embodiment to form a zinc-deposited base material for metallized capacitors. The results of measurements are shown in Table 2.

Embodiment 10

Except for using $SiO_2$ having an average thickness of 2 nm (approximately 4 mg/m$^2$), instead of methylphenylpolysiloxane which was used to form the protective layer in Embodiment 1, the same steps as were carried out in Embodiment 1 were carried out in this embodiment to form a zinc-deposited base material for metallized capacitors. The results of measurements are shown in Table 2.

Comparative Example 1

Except for using Cu instead of SiO which was used to form the primer layer in Embodiment 1, the same steps as were carried out in Embodiment 1 were carried out in this comparative example to form a zinc-deposited base material for metallized capacitors. The results of measurements are shown in Table 2.

Comparative Example 2

Except for using Al instead of SiO which was used to form the primer layer in Embodiment 1, the same steps as were carried out in Embodiment 1 were carried out in this comparative example to form a zinc-deposited base material for metallized capacitors. The results of measurements are shown in Table 2.

Comparative Example 3

Except for using Cu instead of SiO which was used to form the primer layer in Embodiment 1, the same steps as were carried out in Embodiment 1 were carried out in this comparative example to form a zinc-deposited base material for metallized capacitors. The results of measurements are shown in Table 2.

Comparative Example 4

Except for no provision of a protective layer, the same steps as were carried out in Embodiment 1 were carried out in this comparative example to form a zinc-deposited base material for metallized capacitors. The results of measurements are shown in Table 2.

Embodiment 11

Except for using the materials indicated by the symbols A–E and G–L in Table 1 to form a protective layer having an average thickness of 2 nm, instead of methylphenylpolysiloxane which was used to form the protective layer in Embodiment 1, the same steps as were carried out in Embodiment 1 were carried out in this embodiment to form a zinc-deposited base material for metallized capacitors provided with a SiO primer layer for zinc-deposition. Further, in this regard it should be noted that the materials indicated by the symbols A–C, F and G are made by Shin-Etsu Chemical Co., Ltd.(*1). D and E are made by Toray. Dowcorning Silicon Co., Ltd.(*2). H and I are made by DAIKIN INDUSTRIES, LTD.(*3). J is made by LION CORPORATION (*4). K is made by Matsumura Oil Co., Ltd.(*5). The results of measurements are shown in Table 1.

Industrial Utilization

As can be seen from the results of Tables 1 and 2, because the zinc-deposited base material for metallized capacitors and method of manufacture thereof according to the present invention make it possible to remarkably improve the moisture resistance, there is no loss of conductivity in the electrodes over time. Furthermore, because the present invention makes it possible to achieve high reliability, there is very little need for maintenance, and thus the zinc-deposited base material according to the present invention is particularly suitable for use in power capacitors.

TABLE 1

| Symbol | Composition | Product Name | | Temperature (°C.) at Vapor Pressure of $0.1_{mm}Hg$ | Molecular Weight | Evaluation | |
|---|---|---|---|---|---|---|---|
| | | | | | | ΔMR/MRO (%) | tan δ (%) |
| A | Dimethyl-polysiloxane | KF-96 | 20CS*1 | 222 | 1900 | 50 | 0.044 |
| B | Dimethyl-polysiloxane | KF-96 | 50CS*1 | 260 | 3500 | 45 | 0.044 |
| C | Dimethyl-polysiloxane | KF-96 | 100CS*1 | 285 | 5800 | 35 | 0.042 |
| D | Methylphenyl polysiloxane | SH-704 | *2 | 185 | 484 | 30 | 0.039 |
| E | Methylphenyl polysiloxane | SH-705 | *2 | 220 | 546 | 20 | 0.038 |
| F | Methylphenyl polysiloxane | HIVAC F4 | *1 | 180 | 484 | 25 | 0.039 |
| G | Methylphenyl polysiloxane | HIVAC F5 | *1 | 210 | 546 | 15 | 0.040 |
| H | Perfluoro-polyether | DEMNAM S20 | *3 | 210 | 2700 | 25 | 0.042 |
| I | Perfluoro-polyether | DEMNAM S65 | *3 | 230 | 4500 | 20 | 0.042 |
| J | Alkyl-naphthalene | LION Diffusion Pump Oil | *4 | 180 | 375 | 40 | 0.046 |
| K | Poly-diphenylether | NEOPACK SK-A | *5 | 160 | 382 | 50 | 0.046 |
| L | Stearic acid | Reagent of Special Class | | 151 | 284 | 50 | 0.046 |

TABLE 2

| | Voltage-tan δ (%) at 23° C. | | | Moisture Resistance Test - Changes of External Appearance after Test | |
|---|---|---|---|---|---|
| Item | 100 V | 200 V | 300 V | 40° C. 90%, 48 hours | 70° C. 65%, 48 hours |
| Embodiment 1 | 0.027 | 0.030 | 0.039 | Corrosion resistance was excellent. | Corrosion resistance was excellent. |
| Embodiment 2 | 0.027 | 0.030 | 0.037 | Corrosion resistance was excellent. | Corrosion resistance was excellent. |
| Embodiment 3 | 0.026 | 0.031 | 0.039 | Corrosion resistance was excellent. | Corrosion resistance was excellent. |
| Embodiment 4 | 0.025 | 0.029 | 0.036 | Corrosion resistance was excellent. | Corrosion resistance was excellent. |
| Embodiment 5 | 0.026 | 0.031 | 0.038 | Corrosion resistance was excellent. | Corrosion resistance was excellent. |
| Embodiment 6 | 0.029 | 0.031 | 0.044 | Corrosion resistance was excellent. | Corrosion resistance was excellent. |
| Embodiment 7 | 0.026 | 0.031 | 0.042 | Corrosion resistance was excellent. | Corrosion resistance was excellent. |
| Embodiment 8 | 0.027 | 0.032 | 0.046 | Corrosion resistance was excellent. | Corrosion resistance was excellent. |
| Embodiment 9 | 0.028 | 0.031 | 0.048 | Corrosion resistance was excellent. | Corrosion resistance was excellent. |
| Embodiment 10 | 0.026 | 0.029 | 0.039 | Corrosion resistance was excellent. | Corrosion resistance was excellent. |
| Comparative example 1 | 0.026 | 0.030 | 0.040 | Pitting corrosion was observed. | Pinholes were formed by corrosion. |
| Comparative example 2 | 0.026 | 0.029 | 0.036 | Corrosion resistance was excellent. | |

TABLE 2-continued

| Item | Voltage-tan δ (%) at 23° C. | | | Moisture Resistance Test - Changes of External Appearance after Test | |
|---|---|---|---|---|---|
| | 100 V | 200 V | 300 V | 40° C. 90%, 48 hours | 70° C. 65%, 48 hours |
| Comparative example 3 | 0.027 | 0.030 | 0.039 | Corrosion resistance was excellent. | |
| Comparative example 4 | 0.028 | 0.031 | 0.041 | Whole surface was corroded. | Whole surface was corroded. |

What is claimed is:

1. A capacitor comprising:

a base body made of a thermoplastic film or a condenser paper;

a primer layer for zinc-deposition provided on at least one side surface of the base body, the primer layer being formed from at least one compound selected from the group consisting of an oxide of silicon and an oxide of zirconium and having a thickness of from 0.001 to 10.00 nm;

a zinc-deposited layer provided on the primer layer; and a protective layer provided on the zinc-deposited layer, said protective layer being selected from the group consisting of an organic material having a vapor pressure of 0.1 mmHg at a temperature of from 150° to 290° C. and a layer thickness of from 0.7 to 50.0 nm and an inorganic material having a layer thickness of from 1.0 to 30.0 nm and formed from at least one member selected from the group consisting of an oxide of silicon, an oxide of titanium and an oxide of zirconium.

2. The capacitor as claimed in claim 1, wherein the organic material used to form the protective layer is at least one compound selected from the group consisting of fluoro-based oil, alkylnaphthalene and polydiphenylether.

3. The capacitor as claimed in claim 1, wherein the protective layer is formed of an inorganic material.

4. The zinc-deposited base material as claimed in claim 1, wherein the primer layer has a thickness of from 0.1 to 20 nm.

5. A method of manufacturing a capacitor comprising the steps of:

forming a primer layer for zinc-deposition on at least one side surface of a base body made from a thermoplastic film or a condenser paper, the primer layer having a thickness of from 0.01 to 10.00 nm and being formed from at least one compound selected from the group consisting of an oxide of silicon and an oxide of zirconium by deposition;

forming a zinc-deposited layer on top of the primer layer; and forming a protective layer on top of the zinc-deposited layer, said protective layer being selected from the group consisting of an organic material having a vapor pressure of 0.1 mmHg at a temperature of from 150° to 290° C. and a layer thickness of from 0.7 to 50.0 nm and an inorganic material having a layer thickness of from 1.0 to 30.0 nm and formed from at least one member selected from the group consisting of an oxide of silicon, an oxide of titanium and an oxide of zirconium.

6. The method of manufacturing a capacitor as claimed in claim 5, wherein the protective layer is formed of an organic material.

7. In a metallized capacitor having a base material made of a film or a condenser paper, a zinc electrode layer and a protective layer formed on the zinc electrode layer, the improvement comprising a primer layer being provided between and directly bonded with said base material and said zinc electrode layer, said primer layer being formed from at least one compound selected from the group consisting of an oxide of silicon, an oxide of titanium and an oxide of zirconium.

8. In a method of manufacturing a metallized capacitor having a base material made of a film or a condenser paper, a zinc electrode layer and a protective layer formed on the zinc electrode layer, the improvement comprising forming a primer layer between and directly bonded with said base material and zinc electrode layer, said primer layer being formed from at least one compound selected from the group consisting of an oxide of silicon, an oxide of titanium and an oxide of zirconium.

* * * * *

UNITED STATES PATENT AND TRADEMARK OFFICE
CERTIFICATE OF CORRECTION

PATENT NO. : 5 719 741
DATED : February 17, 1998
INVENTOR(S) : Makoto IMAI et al It is certified that error appears in the above-indentified patent and that said Letters Patent is hereby corrected as shown below:

Column 11, line 22; change "0.001" to ---0.01---.

Column 11, line 42; change "20" to ---2.0---.

Signed and Sealed this

Twenty-third Day of June, 1998

Attest:

BRUCE LEHMAN

*Attesting Officer*       *Commissioner of Patents and Trademarks*